United States Patent
Jhou

(10) Patent No.: US 11,253,045 B2
(45) Date of Patent: Feb. 22, 2022

(54) SYSTEMS AND METHODS FOR RECOMMENDATION OF MAKEUP EFFECTS BASED ON MAKEUP TRENDS AND FACIAL ANALYSIS

(71) Applicant: Perfect Mobile Corp., New Taipei (TW)

(72) Inventor: Wei-Cih Jhou, Taichung (TW)

(73) Assignee: PERFECT MOBILE CORP., New Taipei (TW)

( * ) Notice: Subject to any disclaimer, the term of this patent is extended or adjusted under 35 U.S.C. 154(b) by 127 days.

(21) Appl. No.: 16/900,149

(22) Filed: Jun. 12, 2020

(65) Prior Publication Data

US 2021/0015242 A1    Jan. 21, 2021

Related U.S. Application Data

(60) Provisional application No. 62/875,581, filed on Jul. 18, 2019.

(51) Int. Cl.
*G06K 9/00* (2006.01)
*A45D 44/00* (2006.01)
(Continued)

(52) U.S. Cl.
CPC ....... *A45D 44/005* (2013.01); *G06K 9/00248* (2013.01); *G06K 9/00268* (2013.01);
(Continued)

(58) Field of Classification Search
CPC .......... A45D 44/005; A45D 2044/007; G06K 9/00248; G06K 9/00268; G06K 9/46;
(Continued)

(56) References Cited

U.S. PATENT DOCUMENTS 6,502,583 B1    1/2003  Utsugi
9,986,812 B2 *  6/2018  Yamanashi .......... A45D 44/005
(Continued)

FOREIGN PATENT DOCUMENTS

CN    102693288 A    9/2012
CN    108154121 A    6/2018
(Continued)

OTHER PUBLICATIONS

European Search Report dated Sep. 16, 2020, issued in application No. 20183126.0.
(Continued)

*Primary Examiner* — Nimesh Patel
(74) *Attorney, Agent, or Firm* — McClure, Qualey & Rodack, LLP

(57) ABSTRACT

A computing device generates a collection of digital images depicting makeup effects representing makeup trends, analyzes the collection of digital images, and extracts target attributes. The computing device constructs a database of makeup recommendation entries comprising the collection of digital images and extracted attributes and receives a query request from a user comprising an image of the user's face. The computing device queries the database and obtains a first number of makeup recommendations. The computing device merges makeup recommendations among the first number of makeup recommendations to generate a second number of makeup recommendations and displays at least a portion of the second number of makeup recommendations and receiving a selection from the user. The computing device performs virtual application of a makeup effect corresponding to the selection.

19 Claims, 5 Drawing Sheets

(51) Int. Cl.
*G06K 9/46* (2006.01)
*G06N 3/08* (2006.01)
*G06Q 30/06* (2012.01)

(52) U.S. Cl.
CPC .............. *G06K 9/46* (2013.01); *G06N 3/08* (2013.01); *G06Q 30/0631* (2013.01); *A45D 2044/007* (2013.01)

(58) Field of Classification Search
CPC ........... G06K 9/00771; G06K 9/00228; G06K 9/00288; G06K 2209/03; G06K 9/6201; G06K 9/6268; G06K 9/00201; G06K 9/00255; G06K 9/00281; G06K 9/00302; G06K 9/00604; G06K 9/0061; G06K 9/00791; G06K 9/00912; G06K 9/6221; G06K 9/6262; G06K 9/6217; G06K 9/6288; G06K 9/62; G06K 9/00637; G06K 9/3241; G06K 9/6251; G06K 2209/09; G06K 9/00362; G06K 9/00369; G06K 9/00375; G06K 9/00671; G06K 9/36; G06K 9/00677; G06N 3/08; G06N 20/00; G06N 20/20; G06N 3/0454; G06N 5/02; G06N 5/022; G06N 7/005; G06N 3/006; G06N 3/088; G06N 3/126; G06N 3/02; G06N 3/0427; G06N 3/086; G06N 5/003; G06N 3/0436; G06N 5/025; G06N 5/04; G06N 7/02; G06Q 30/0631; G06Q 30/0643; G06Q 30/0623; G06Q 10/0875; G06Q 30/0202; G06Q 30/00; G06Q 30/02; G06Q 30/0621; G06Q 50/01; G06Q 50/22; G06Q 20/127; G06Q 20/18; G06Q 20/32; G06F 17/18; G06F 2211/005; G06F 16/2379; G06F 16/538; G06F 16/583; G06F 16/95; G06T 2207/20081; G06T 2207/20084; G06T 2207/30168; G06T 7/0004; G06T 11/00; G06T 19/00; G06T 2210/16; G06T 11/001; G06T 11/60; G06T 17/00; G06T 2200/08; G06T 7/11
See application file for complete search history.

(56) References Cited

U.S. PATENT DOCUMENTS

| | | | |
|---|---|---|---|
| 10,282,914 B1* | 5/2019 | Tran | ...................... G01G 19/44 |
| 2007/0172155 A1 | 7/2007 | Guckenberger | |
| 2013/0129210 A1 | 5/2013 | Na | |
| 2013/0215116 A1* | 8/2013 | Siddique | .............. G06Q 20/204 345/420 |
| 2015/0086945 A1 | 3/2015 | Yamanashi et al. | |
| 2015/0324103 A1* | 11/2015 | Tepmongkol | .......... G06Q 50/01 715/757 |
| 2015/0366328 A1* | 12/2015 | Tamura | ................ A45D 44/005 434/100 |
| 2016/0128450 A1 | 5/2016 | Saito et al. | |
| 2016/0143423 A1 | 5/2016 | Yamanashi et al. | |
| 2016/0189274 A1* | 6/2016 | MacLaurin | ............ G06Q 50/01 705/26.7 |
| 2017/0178220 A1* | 6/2017 | Chong | ............... G06K 9/00268 |
| 2018/0268572 A1* | 9/2018 | Nishi | ..................... A45D 44/00 |

FOREIGN PATENT DOCUMENTS

| | | |
|---|---|---|
| CN | 108171143 A | 6/2018 |
| CN | 108985873 A | 12/2018 |
| EP | 1 710 746 A1 | 10/2006 |
| EP | 2 820 970 A1 | 1/2015 |
| EP | 2 821 966 A1 | 1/2015 |
| EP | 3 407 290 A1 | 11/2018 |
| EP | 3 485 762 A1 | 5/2019 |
| JP | 2010-211308 A | 9/2010 |
| WO | 2008/102440 A1 | 8/2008 |
| WO | 2018/014540 A1 | 1/2018 |
| WO | 2018/214115 A1 | 11/2018 |

OTHER PUBLICATIONS

Liu, S., et al.; "Makeup Like a Superstar: Deep Localized Makeup Transfer Network;" Proceedings of the Twenty-Fifth International Joint Conference on Artificial Intelligence; pp. 2568-2575.

Chen, H.J., et al.; "BeatyGlow: On-Demand Makeup Transfer Framework with Reversible Generative Network;" 2019 IEEE/CVF Conference on Computer Vision and Pattern Recognition (CVPR); Jun. 2019; pp. 10034-10042.

Nguyen, T.V., et al.; "Smart Mirror: Intelligent Makeup Recommendation And Synthesis;" hhttps://www.profillic.com/paper/arxiv:1709.07566; Sep. 2017; pp. 1-3.

Alashkar, T., et al.; "Examples-Rules Guided Deep Neural Network For Makeup Recommendation;" Proceedings of the Thirty-First AAAI Conference on Artificial Intelligence; 2017; pp. 941-947.

Dantcheva, A., et al.; "Can facial cosmetics affect the matching accuracy of face recognition systems?;" Proc. of 5th IEEE International Conference on Biometrics: Theory, Applications and Systems; Sep. 2012; pp. 1-9.

* cited by examiner

SYSTEMS AND METHODS FOR RECOMMENDATION OF MAKEUP EFFECTS BASED ON MAKEUP TRENDS AND FACIAL ANALYSIS

CROSS-REFERENCE TO RELATED APPLICATION

This application claims priority to, and the benefit of, U.S. Provisional Patent Applications entitled, "System and Method for Recommended Makeup Retrieval Based on Face Features and Makeup Trends," having Ser. No. 62/875,581, filed on Jul. 18, 2019, which is incorporated by reference in its entirety.

TECHNICAL FIELD

The present disclosure relates to systems and methods for recommending makeup effects based on makeup trends and facial analysis.

BACKGROUND

Consumers invest a substantial amount of money in makeup tools and accessories. Although online makeup tutorials are widely available, it can be challenging to achieve the same results as a makeup professional given the wide selection of cosmetic products for different facial features. Furthermore, the makeup effects in such tutorials are not necessarily tailored to the specific facial characteristics of each individual.

SUMMARY

In accordance with one embodiment, a computing device generates a collection of digital images depicting makeup effects representing makeup trends, analyzes the collection of digital images, and extracts target attributes. The computing device constructs a database of makeup recommendation entries comprising the collection of digital images and extracted attributes and receives a query request from a user comprising an image of the user's face. The computing device queries the database and obtains a first number of makeup recommendations. The computing device merges makeup recommendations among the first number of makeup recommendations to generate a second number of makeup recommendations and displays at least a portion of the second number of makeup recommendations and receiving a selection from the user. The computing device performs virtual application of a makeup effect corresponding to the selection.

Another embodiment is a system that comprises a memory storing instructions and a processor coupled to the memory. The processor is configured by the instructions to generate a collection of digital images depicting makeup effects representing makeup trends, analyze the collection of digital images, and extract target attributes. The processor is further configured to construct a database of makeup recommendation entries comprising the collection of digital images and extracted attributes and receive a query request from a user comprising an image of the user's face. The processor is further configured to query the database and obtain a first number of makeup recommendations. The processor is further configured to merge makeup recommendations among the first number of makeup recommendations to generate a second number of makeup recommendations and display at least a portion of the second number of makeup recommendations and receiving a selection from the user. The processor is further configured to perform virtual application of a makeup effect corresponding to the selection.

Another embodiment is a non-transitory computer-readable storage medium storing instructions to be implemented by a computing device having a processor, wherein the instructions, when executed by the processor, cause the computing device to generate a collection of digital images depicting makeup effects representing makeup trends, analyze the collection of digital images, and extract target attributes. The processor is further configured to construct a database of makeup recommendation entries comprising the collection of digital images and extracted attributes and receive a query request from a user comprising an image of the user's face. The processor is further configured to query the database and obtain a first number of makeup recommendations. The processor is further configured to merge makeup recommendations among the first number of makeup recommendations to generate a second number of makeup recommendations and display at least a portion of the second number of makeup recommendations and receiving a selection from the user. The processor is further configured to perform virtual application of a makeup effect corresponding to the selection.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Although many resources are available to consumers, it can be challenging to achieve the same results as a makeup professional given the wide selection of cosmetic products for different facial features. Furthermore, the makeup effects in such tutorials are not necessarily tailored to the specific facial characteristics of each individual. Various embodiments are disclosed for dynamically recommending makeup effects based on specific facial attributes of the user and based on current makeup trends.

Figure 1:
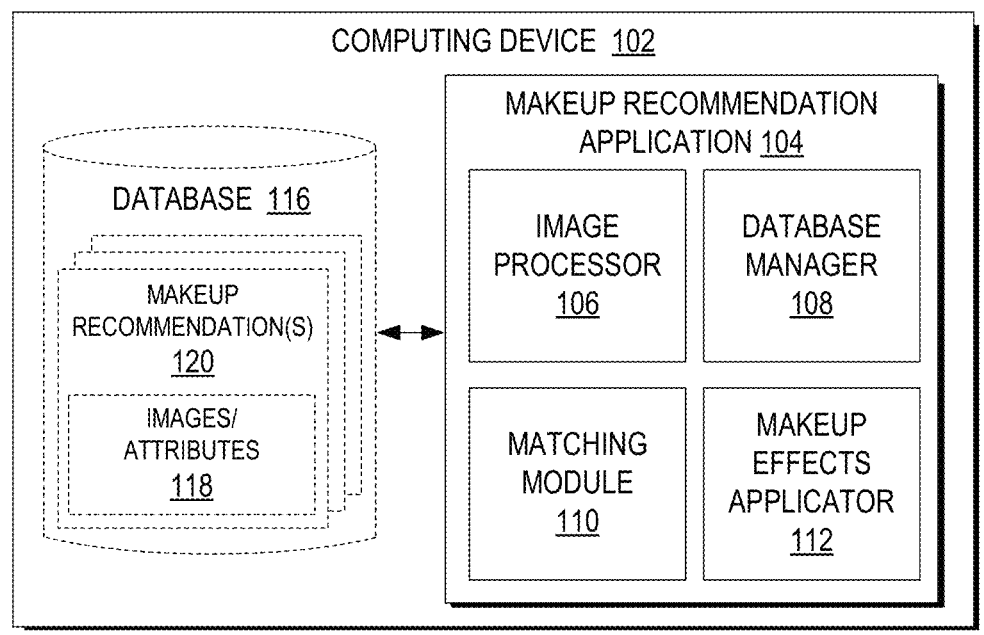
FIG. 1 is a block diagram of a computing device for recommending makeup effects based on makeup trends and facial analysis in accordance with various embodiments of the present disclosure.

A description of a system for recommending makeup effects based on makeup trends and facial analysis is now described followed by a discussion of the operation of the components within the system. FIG. 1 is a block diagram of a computing device 102 in which the disclosed herein may be implemented. The computing device 102 may be embodied as a computing device such as, but not limited to, a smartphone, a tablet computing device, a laptop, and so on.

A makeup recommendation application 104 executes on a processor of the computing device 102 and includes an image processor 106, a database manager 108, a matching module 110, and a makeup effects applicator 112. The image processor 106 is configured to compile a collection of digital images depicting makeup effects representing current makeup trends and analyzes the collection of digital images and extract target attributes. For some embodiments, the image processor 106 includes a web crawler service configured to extract the digital images from different sources, including but not limited to, social media sites, online photo albums, and so on.

The image processor 106 analyzes the collection of digital images and extracts the target attributes utilizing a deep neural network model comprising a plurality of digital image samples corresponding to identities of different individuals. The target attributes can include, for example, a high dimensional vector such as a d-dimensional vector $(x_1, x_2 \ldots x_d)$ characterizing global facial features, landmark facial features, size and shape attributes of facial features, makeup effects, hairstyle, and so on. The target attributes are represented as a d-dimensional vector x, where x is a sequence of d real numbers:

$$(x_1, x_2, \ldots, x_d) \in \mathbb{R}^d$$

The d-dimensional vector x is used to characterize global facial features, landmark facial features, size and shape attributes of features, makeup effects, hairstyle, and so on.

For some embodiments, the deep neural network model is pre-trained or initialized to differentiate between faces corresponding to different identities of individuals. The image processor 106 then fine tunes the deep neural network model by minimizing distances between each digital image sample in the deep neural network model and a center of all digital image samples associated with a same identity of an individual. The image processor 106 further fine tunes the deep neural network model by maximizing a degree of similarity between matching faces while maximizing a distance between non-matching faces.

As one of ordinary skill will appreciate, the digital images may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital image may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The database manager 108 is configured to construct a database 116 of makeup recommendations 120 comprising the collection of digital images 118 as well as related makeup products based on information extracted by the deep neural network model for each digital image 118. The database manager 108 is further configured to process queries generated by a user, where the user uploads an image of the user's face to initiate a query. Once the user uploads the image of the user's face, the database manager 108 automatically performs facial detection and extracts facial features from the uploaded image utilizing the initialized deep neural network model.

The database manager 108 then queries the database and obtains a first number (represented by N) of makeup recommendations 120. Each entry in the database 116 may also includes a time stamp when each digital image 118 was collected by the image processor 106. A corresponding descriptor may also be stored for each digital image 118. For some embodiments, the first number (N) of makeup recommendations 120 may be obtained from the database 116 using a hierarchical navigable small world (HNSW) algorithm whereby the top N entries in the database 116 representing the most similar facial feature matches are identified.

Figure 4:
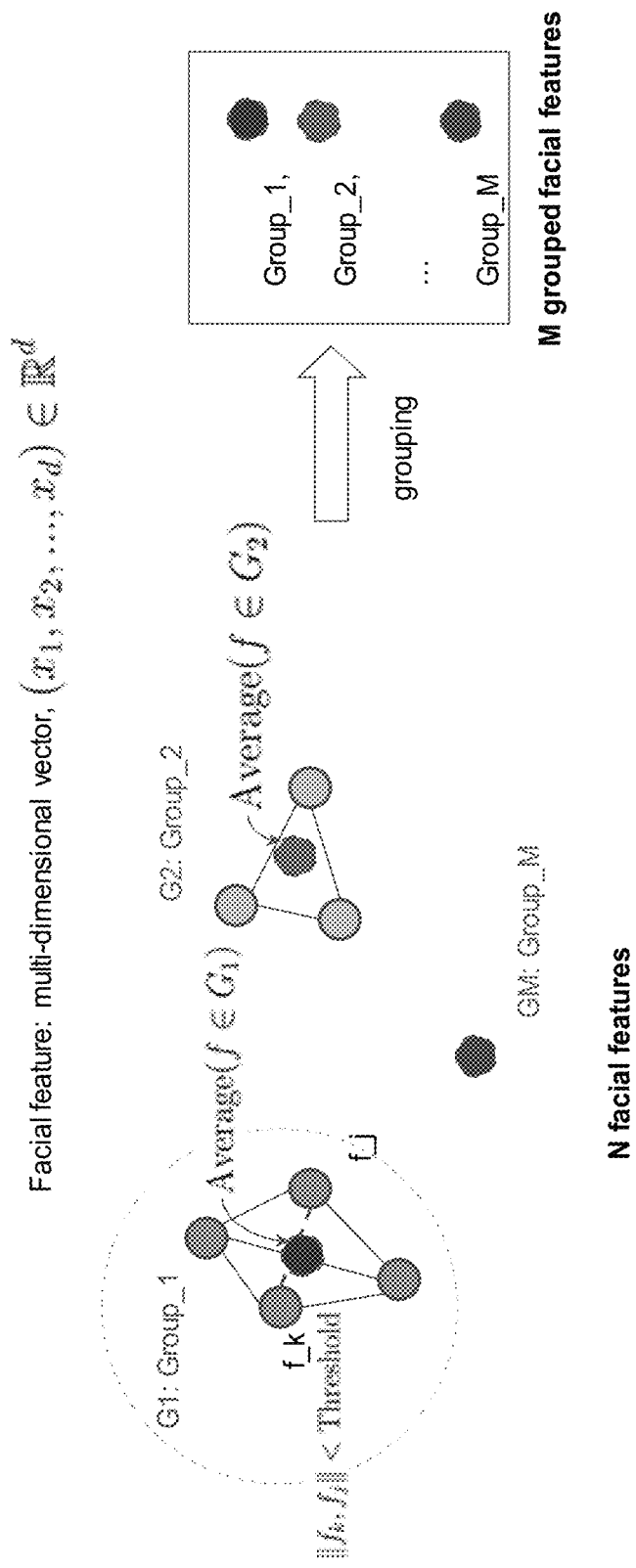
FIG. 4 illustrates the merging of makeup recommendations by the computing device of FIG. 1 among a first number (N) of makeup recommendations to generate a second number (represented by M) of makeup recommendations according to various embodiments of the present disclosure.

The matching module 110 is configured to then merge makeup recommendations 120 among the first number (N) of makeup recommendations 120 to generate a second number (represented by M) of makeup recommendations. The matching module 110 merges makeup recommendations 120 if the distance between pairs of facial features of corresponding digital images is less than a predefined threshold. In particular, if the $k^{th}$ facial feature (denoted by f_k) is similar to the $j^{th}$ facial feature (denoted by f_j), the matching module 110 makes the assumption that the $k^{th}$ and the $j^{th}$ facial features both belong to the same identity. Based on the degree of similarity between these facial features, the matching module 110 also makes the assumption that the respective makeup effects for the $k^{th}$ and the $j^{th}$ facial features are similar. The merging of makeup recommendations 120 among the first number (N) of makeup recommendations 120 to generate a second number (represented by M) of makeup recommendations is illustrated in FIG. 4.

The matching module 110 achieves a higher level of diversity in the makeup recommendations 120 presented to the user by not merely presenting makeup recommendations 120 that correspond to similar images or that correspond to similar combination of makeup effects. To accomplish this, the matching module 110 recursively merges or groups similar pairs of makeup recommendations 120 with corresponding facial features where the linkage distance between the pair of facial features (f_k and f_j) is less than a predefined threshold T. The predefined threshold T relates to the margin setting derived during the fine tuning stage of the deep neural network model described earlier. This margin is defined as the distance from a given facial feature (feature point) to a decision boundary.

The matching module 110 merges the pair of makeup recommendations 120 having facial features (f_k and f_j) together and forms a new group (denoted by g), which contains the two makeup recommendations 120 with facial features (f_k and f_j). A new makeup recommendation 120 with facial feature (denoted by f_g) is created and designated as a representative makeup recommendation 120 of the newly formed group g, where the new facial feature f_g of the representative makeup recommendation 120 is created by computing the average of the facial features in the group g (AVERAGE (f_k, f_j)). The matching module 110 then randomly selects a makeup recommendation 120 in group g (f_k and f_j) and designates this randomly selected makeup recommendation 120 as the representative makeup recommendation 120 of group g, thereby avoiding the presentation of similar or redundant makeup recommendations 120.

The predefined threshold (T) that is utilized in determining whether to merge facial features can be adjusted by the user to adjust the diversity level of the makeup recommendations 120. For example, if the user sets the value of this predefined threshold T to zero, this results in no merging or grouping of makeup recommendations 120. This will likely result in makeup recommendations 120 relating to similar faces or even to faces corresponding to the same identity (i.e., same individual). On the other hand, if the value of the predefine threshold (T) is set too high, makeup recommendations 120 relating to dissimilar faces or faces corresponding to different identities (i.e., different identities) may be merged or grouped together. As such, the user can adjust the predefined threshold (T) value as needed to achieve the desired level of diversity among makeup recommendations 120.

A second number (represented by M) of makeup recommendations 120 is generated once the merging or grouping operation described above is performed by the matching module 110, where the second number (M) may be less than the first number (N) due to the merging of makeup recommendations 120. For some embodiments, the second number (M) of makeup recommendations are presented to the user, where the makeup recommendations 120 may include, for example, reference information relating to each image associated with each makeup recommendation 120. Such reference information may comprise, for example, a related tweet URL (Uniform Resource Locator), the time stamp of a particular tweet, tweet content, like rating, and so on.

The makeup recommendations 120 presented to the user may also include makeup analysis results that specify particular makeup products for particular facial features (e.g., makeup products for the eyebrows, eye makeup, blush, lipstick). The makeup recommendations 120 presented to the user may also include information relating to a makeup try-on kit for allowing the user to actually apply selected makeup products.

After the user selects one of the makeup recommendations 120, the makeup effects applicator 112 is configured to perform virtual application of the selected makeup effect(s) on a digital image of the user. For instances where the user selects multiple makeup recommendations 120, the user can select which specific makeup effects to apply and the order in which the makeup effects are applied. Once virtual application of the selected makeup effects are completed, the user can capture screenshots for purposes of sharing the digital images of the user with others.

Figure 5:
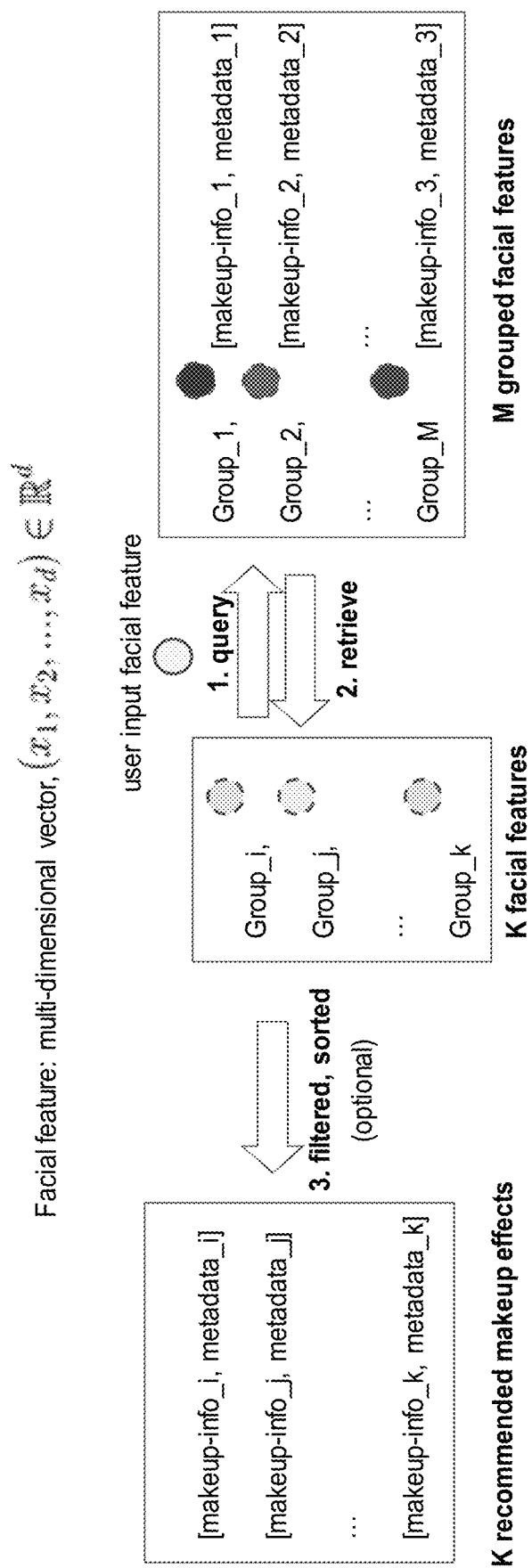
FIG. 5 illustrates filtering by the computing device of FIG. 1 of the (M) makeup recommendations to generate a third number (represented by K) of makeup recommendations according to various embodiments of the present disclosure.

For some embodiments, the list of (M) makeup recommendations 120 is further narrowed to increase the likelihood that the user will select one or more of the makeup recommendations 120 presented to the user, the matching module 110 applies filtering to the (M) makeup recommendations 120 to generate a third number (represented by K) of makeup recommendations. The filtering may be performed based on the time when the user queries the database 116, user preferences, current makeup trend information, and so on. For such embodiments, the third number (K) of makeup recommendations 120 are presented to the user and a selection of a desired makeup recommendation 120 is received. FIG. 5 illustrates filtering of the (M) makeup recommendations 120 to generate a third number (represented by K) of makeup recommendations.

Figure 2:
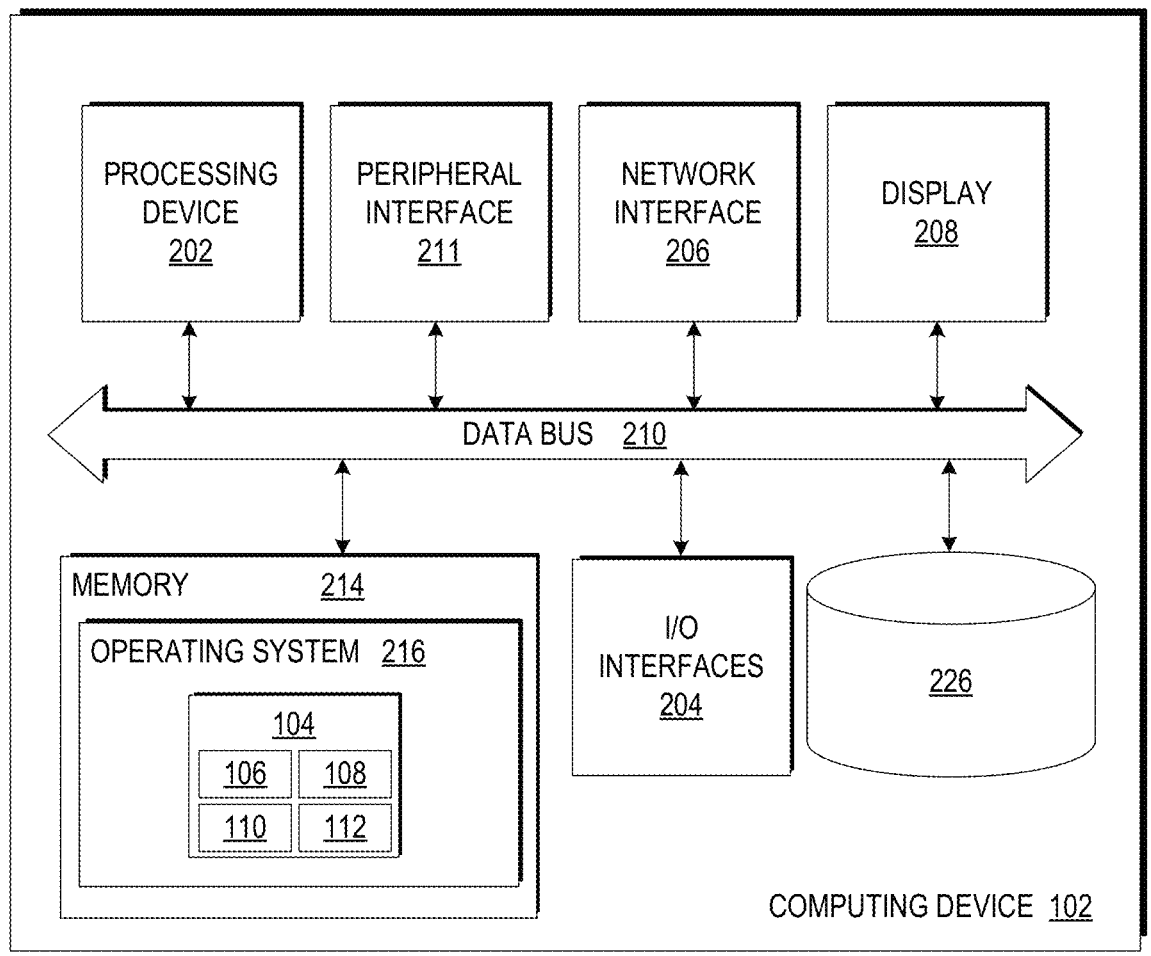
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
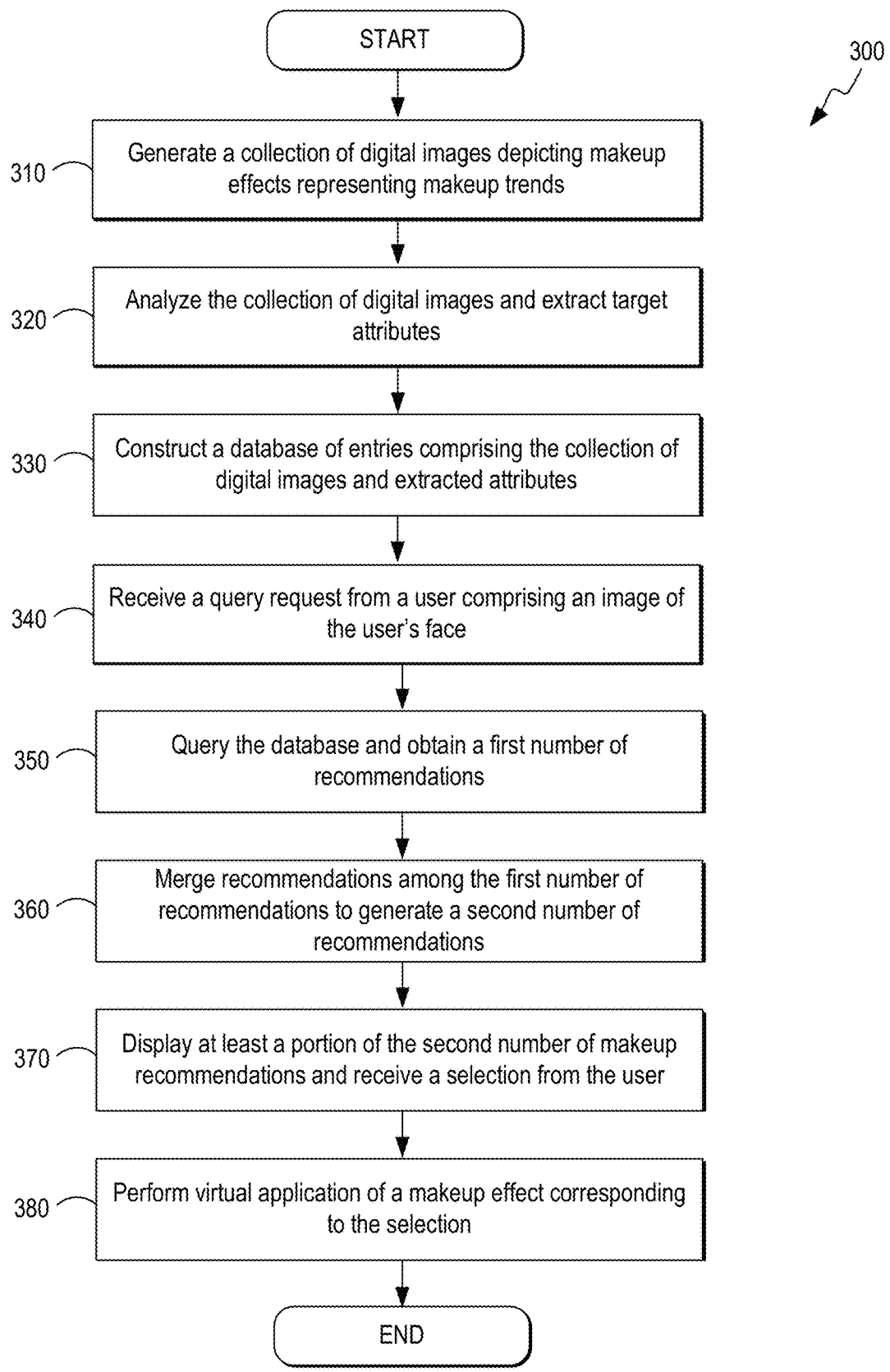
FIG. 3 is a top-level flowchart illustrating examples of functionality implemented as portions of the computing device of FIG. 1 for recommending makeup effects based on makeup trends and facial analysis according to various embodiments of the present disclosure.

Reference is made to FIG. 3, which is a flowchart 300 in accordance with various embodiments for recommending makeup effects based on makeup trends and facial analysis performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 generates a collection of digital images depicting makeup effects representing current makeup trends and analyzes the collection of digital images and extract target attributes. For some embodiments, the collection of digital images is generated utilizing a web crawler service, wherein the web crawler service extracts at least some of the digital images from social media sites.

At block 320, the computing device 102 analyzes the collection of digital images and extracts the target attributes utilizing a deep neural network model comprising a plurality of samples corresponding to identities of different individuals. The target attributes can include, for example, a high dimensional vector characterizing global facial features, landmark facial features, size and shape attributes of facial features, makeup effects, hairstyle, and so on.

For some embodiments, the deep neural network model is pre-trained or initialized to differentiate faces corresponding to different identities of individuals. The computing device 102 then fine tunes the deep neural network model by minimizing distances between each sample in the deep neural network model and a center of all samples associated with a same identity of an individual. The computing device 102 further fine tunes the deep neural network model by maximizing a degree of similarity between matching faces while maximizing a distance between non-matching faces.

At block 330, the computing device 102 constructs a database 116 (FIG. 1) of entries comprising the collection of digital images 118 and extracted attributes. For some embodiments, each entry in the database 116 may also include a time stamp when each digital image 118 was collected. A corresponding descriptor may also be stored for each digital image 118. At block 340, the computing device 102 receives a query generated by a user, where the user uploads an image of the user's face. At block 350, the computing device 102 queries the database and obtains a first number of makeup recommendations 120.

At block 360, the computing device 102 merges recommendations among the first number of recommendations 120 (FIG. 1) to generate a second number of recommendations. For some embodiments, the computing device 102 merges makeup recommendations to generate the second number of makeup recommendations by grouping faces in the database 116 meeting a threshold degree of similarity, and for each grouping of faces, randomly selecting a single face as a representative face. For some embodiments, each face in the database 116 depicts a corresponding makeup effect, and the computing device 102 groups the faces in the database by grouping faces depicting makeup effects exhibiting a threshold degree of similarity into a same category and calculating an average value for each category to generate a representative value for each category. For some embodiments, each of the second number of makeup recommendations can comprise social media information and/or recommended makeup products.

At block 370, the computing device 102 displays at least a portion of the second number of makeup recommendations and receives a selection from the user. At block 380, the computing device 102 performs virtual application of a makeup effect corresponding to the selection. Thereafter, the process in FIG. 3 ends.

For some embodiments, the computing device 102 may be further configured to filter the second number of makeup recommendations to generate a third number of makeup recommendations, where the portion of the second number of makeup recommendations displayed comprises the third number of makeup recommendations. For such embodiments, the computing device 102 filters the second number of makeup recommendations to generate the third number of makeup recommendations by prioritizing among the second number of makeup recommendations based on a time stamp associated with the query, user preferences, and/or current makeup trends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device, comprising:
   generating a collection of digital images depicting makeup effects representing makeup trends;
   analyzing the collection of digital images and extracting target attributes, wherein analyzing the collection of the digital images and extracting the target attributes comprise:
      pre-training a deep neural network model to differentiate faces corresponding to different identities of individuals;
      fine tuning the deep neural network model by minimizing distances between each sample and a center of all samples of a same identity; and
      fine tuning the deep neural network model by maximizing a degree of similarity between matching faces and maximizing a distance between non-matching faces, wherein analyzing the collection of the digital images and extracting the target attributes are performed utilizing the deep neural network model;

constructing a database of makeup recommendation entries comprising the collection of digital images and extracted attributes;

receiving a query request from a user comprising an image of the user's face;

querying the database and obtaining a first number of makeup recommendations;

merging makeup recommendations among the first number of makeup recommendations to generate a second number of makeup recommendations;

displaying at least a portion of the second number of makeup recommendations and receiving a selection from the user; and performing virtual application of a makeup effect corresponding to the selection.

2. The method of claim 1, further comprising filtering the second number of makeup recommendations to generate a third number of makeup recommendations, wherein the at least the portion of the second number of makeup recommendations displayed comprises the third number of makeup recommendations.

3. The method of claim 2, wherein filtering the second number of makeup recommendations to generate the third number of makeup recommendations comprises prioritizing among the second number of makeup recommendations based on at least one of: a time stamp associated with the query request; user preferences; and current makeup trends.

4. The method of claim 1, wherein generating the collection of digital images is performed utilizing a web crawler service, wherein the web crawler service extracts at least some of the digital images from social media sites.

5. The method of claim 1, wherein the target attributes comprise a high dimensional vector.

6. The method of claim 5, wherein the high dimensional vector comprises at least one representation of: facial contour, hair style, hair color, head shape, size and shape of facial features, and makeup effects.

7. The method of claim 1, wherein each entry in the database further comprises a time stamp when each digital image was collected and a descriptor.

8. The method of claim 1, wherein merging the makeup recommendations to generate the second number of makeup recommendations comprises:

grouping faces in the database meeting a threshold degree of similarity; and for each grouping of faces, randomly selecting a single face as a representative face.

9. The method of claim 8, wherein each face in the database depicts a corresponding makeup effect.

10. The method of claim 9, wherein grouping the faces in the database comprises:

grouping faces depicting makeup effects exhibiting a threshold degree of similarity into a same category; and calculating an average value for each category to generate a representative value for each category.

11. The method of claim 1, wherein each of the second number of makeup recommendations comprises at least one of: social media information; and recommended makeup products.

12. A system, comprising:

a memory storing instructions;

a processor coupled to the memory and configured by the instructions to at least:

generate a collection of digital images depicting makeup effects representing makeup trends;

analyze the collection of digital images and extract target attributes, wherein analyzing the collection of the digital images and extracting the target attributes comprise:

pre-training a deep neural network model to differentiate faces corresponding to different identities of individuals;

fine tuning the deep neural network model by minimizing distances between each sample and a center of all samples of a same identity; and fine tuning the deep neural network model by maximizing a degree of similarity between matching faces and maximizing a distance between nonmatching faces, wherein analyzing the collection of the digital images and extracting the target attributes are performed utilizing the deep neural network model;

construct a database of makeup recommendation entries comprising the collection of digital images and extracted attributes;

receive a query request from a user comprising an image of the user's face;

query the database and obtaining a first number of makeup recommendations;

merge makeup recommendations among the first number of makeup recommendations to generate a second number of makeup recommendations;

display at least a portion of the second number of makeup recommendations and receiving a selection from the user; and perform virtual application of a makeup effect corresponding to the selection.

13. The system of claim 12, wherein the processor is further configured to filter the second number of makeup recommendations to generate a third number of makeup recommendations, wherein the at least the portion of the second number of makeup recommendations displayed comprises the third number of makeup recommendations.

14. The system of claim 13, wherein the processor filters the second number of makeup recommendations to generate the third number of makeup recommendations by prioritizing among the second number of makeup recommendations based on at least one of: a time stamp associated with the query request; user preferences; and current makeup trends.

15. The system of claim 12, wherein the processor merges the makeup recommendations to generate the second number of makeup recommendations by grouping faces in the database meeting a threshold degree of similarity, and for each grouping of faces, randomly selecting a single face as a representative face.

16. A non-transitory computer-readable storage medium storing instructions to be implemented by a computing device having a processor, wherein the instructions, when executed by the processor, cause the computing device to at least:

generate a collection of digital images depicting makeup effects representing makeup trends;

analyze the collection of digital images and extract target attributes, wherein analyzinq the collection of the diqital imaqes and extractinq the target attributes comprise:

pre-training a deep neural network model to differentiate faces corresponding to different identities of individuals;

fine tuning the deep neural network model by minimizing distances between each sample and a center of all samples of a same identity; and fine tuning the deep neural network model by maximizing a degree of similarity between matching faces and maximizinq a distance between non-matching faces, wherein analyzing the collection of the diqital images and extracting the target attributes are performed utilizing the deep neural network model;

construct a database of makeup recommendation entries comprising the collection of digital images and extracted attributes;

receive a query request from a user comprising an image of the user's face;

query the database and obtaining a first number of makeup recommendations;

merge makeup recommendations among the first number of makeup recommendations to generate a second number of makeup recommendations;

display at least a portion of the second number of makeup recommendations and receiving a selection from the user; and perform virtual application of a makeup effect corresponding to the selection.

17. The non-transitory computer-readable storage medium of claim 16, wherein the processor is further configured to filter the second number of makeup recommendations to generate a third number of makeup recommendations, wherein the at least the portion of the second number of makeup recommendations displayed comprises the third number of makeup recommendations.

18. The non-transitory computer-readable storage medium of claim 17, wherein the processor filters the second number of makeup recommendations to generate the third number of makeup recommendations by prioritizing among the second number of makeup recommendations based on at least one of: a time stamp associated with the query request; user preferences; and current makeup trends.

19. The non-transitory computer-readable storage medium of claim 16, wherein the processor merges the makeup recommendations to generate the second number of makeup recommendations by grouping faces in the database meeting a threshold degree of similarity, and for each grouping of faces, randomly selecting a single face as a representative face.

* * * * *